No. 7,314.  
PATENTED APR. 23, 1850.  
E. F. WHITON.  
INSTRUMENT FOR MEASURING CLOTH.

UNITED STATES PATENT OFFICE.

E. F. WHITON, OF WEST STAFFORD, CONNECTICUT.

INSTRUMENT FOR MEASURING CLOTH.

Specification of Letters Patent No. 7,314, dated April 23, 1850.

*To all whom it may concern:*

Be it known that I, E. F. WHITON, of West Stafford, in the county of Tolland and State of Connecticut, have invented a new and useful Improvement in Machines for Measuring Cloth and other Fabrics; and I do hereby declare that the following is a full, clear, and exact description of the same, reference being had to the accompanying drawings, in which—

Figure 1:
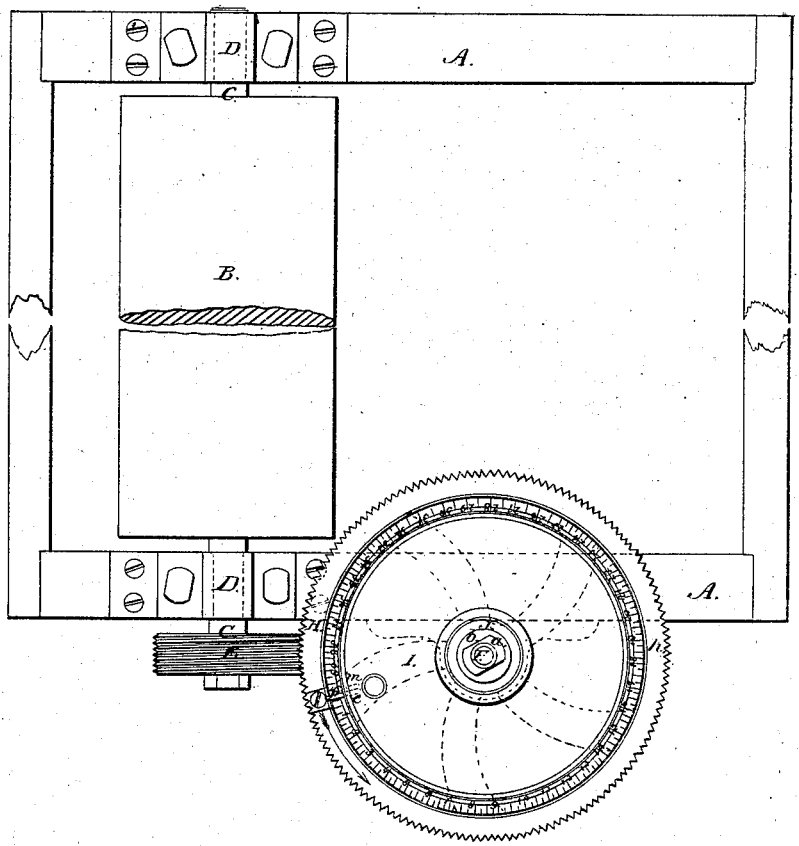
Figure 2:
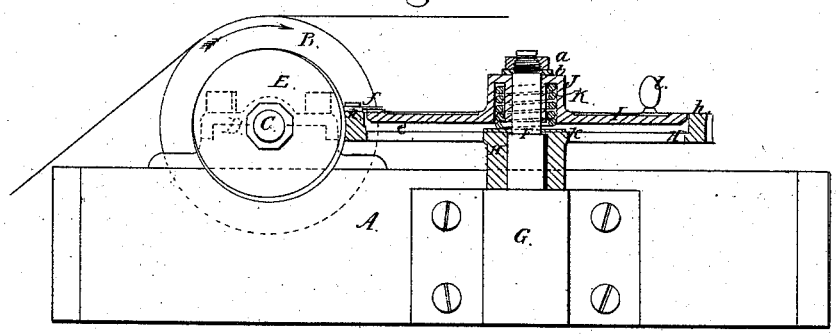

Figure 1, represents a plan having the frame and roller broken away near the middle. Fig. 2, is an elevation, the traveler and index plate being in section.

The same letters refer to corresponding parts in the several figures.

The nature of my invention consists in a roller, mounted on a shaft capable of revolving in fixed bearings and carrying an endless screw gearing into the toothed periphery of a wheel or traveler revolving on a fixed spindle or stud placed vertically or at right angles to the shaft carrying the roller and endless screw; on the same fixed stud is a circular graduated index plate which may be turned to any position on the axis of the fixed shaft, but will not be moved by the revolution of the traveler; the cloth to be measured passes over the roller causing it to rotate, thereby communicating rotary motion to the traveler which carries a finger or indicator pointing to the graduated index plate and denoting the distance traveled by the periphery of the rolling shaft, the number of yards which have passed over the roller.

To enable others skilled in the art to make and use my invention I will proceed to describe its construction and operation.

A, A, represents a frame of suitable strength and form.

B, is the roller mounted on the shaft C, working in bearings D, D.

E, is an endless screw gear firmly mounted on the end of the shaft C.

F, is a fixed stud or spindle secured in a socket G, which is bolted to the frame A.

H, is the traveler wheel fitted so as to revolve easily on the lower part of the stud F, supported on the socket G, and having teeth on its periphery into which the endless screw E, gears. A stop e, is fixed in one of the arms and a finger or indicator (f) is attached to its upper surface.

I, is the circular graduated adjustable index plate which is fitted so as to turn freely so as to be adjusted when required on the upper part of the stud F, which is of smaller diameter than the lower part. The index plate I, is sunk within the outer projecting ring h of the traveling wheel H and has its face flush with the upper face of the said projecting ring; it is provided with a hollow boss J, having a deep groove or recess on its under side.

K is a helical spring bearing upward at the top of the groove or recess in the boss J, and downward upon a washer or collar k which is fitted on the stud F and rests on the top of the traveler wheel H. The upper part of the stud F, is provided with a male screw, and the index plate is secured on the stud by means of a nut a and washer b; the spring K always tending to raise it upward against the washer b and keep it stationary so as to allow the traveler wheel to rotate independently of it.

l is a handle for turning the index plate I when required.

m is a fixed stop on the under side of the index plate, at the same distance from the center of the stud F as the stop e on the traveler wheel H.

The red lines in the drawings represent the edge of the cloth and the speed arrows denote the direction in which the roller B, and the traveler wheel H, rotate.

This machine is designed to stand on or to be attached to a machine for winding cloth, for the purpose of measuring it while being wound; it may also be applied to measuring cloth in other ways.

The operation of the machine is as follows: The index plate I, is set by hand so as to bring the stop m under the index plate to the stop e on the traveler wheel, when the starting point will be opposite the finger or indicator f. The cloth to be measured is then passed over the roller B, causing it to rotate; the endless screw gear E, gearing into the traveler wheel H, will cause it to move on its axis passing the finger or indicator f over the graduating index; as soon as the piece of cloth is all wound, the roller B, will of course become stationary as will also the traveler wheel H, and the indicator f, will point out on the index the number of yards that have passed over the roller B.

The manner in which I graduate the index plate I is as follows. After the machine is put together I pass over the roller B, a piece of cloth of a certain known length sufficient to cause nearly one revolution of the traveler wheel H, and having marked the starting and stopping points on the index plate I divide the distance between them into the number of yards contained in the piece of cloth passed over the roller B, and I further subdivide the yards into halves, quarters or any required fractions of a yard; this will be the only correct way of graduating the index plate as it is obvious that the slightest variation in the diameter of the roller B, or in the pitch of the screw E, and wheel H, would cause variation in the distance traveled by the index plate.

Having fully and I believe clearly described my invention I will proceed to state what I claim which is this—

The manner herein described of measuring cloth or other fabrics by causing the material to pass over and give rotary motion to the roller B, carrying on its axis the endless screw gear E gearing into the teeth of and giving motion to the traveler wheel H, carrying an indicator $f$ pointing out the distance traveled by the periphery of the roller B, on the graduated adjustable index plate I, or by any other mechanical combination substantially the same.

E. F. WHITON.

Witnesses:
J. R. WASHBURN,
A. SHIPPY.